US008694237B1

(12) United States Patent
Romine, III

(10) Patent No.: US 8,694,237 B1
(45) Date of Patent: Apr. 8, 2014

(54) SYSTEM, APPARATUS, AND METHOD FOR GENERATING AIRPORT HOT SPOT INFORMATION

(75) Inventor: John W. Romine, III, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 201 days.

(21) Appl. No.: 13/249,493

(22) Filed: Sep. 30, 2011

(51) Int. Cl.
*G06F 17/10* (2006.01)
*G06G 7/78* (2006.01)
*G08G 1/16* (2006.01)

(52) U.S. Cl.
USPC .......... 701/301

(58) Field of Classification Search
USPC .......... 701/301
See application file for complete search history.

(56) References Cited

U.S. PATENT DOCUMENTS 6,606,563 B2* 8/2003 Corcoran, III .......... 701/301
7,587,278 B2* 9/2009 Poe et al. .......... 701/301
2008/0082472 A1* 4/2008 Dalton .......... 706/45
2008/0104005 A1* 5/2008 Dalton .......... 706/45
2008/0154829 A1* 6/2008 Dalton .......... 706/46
2009/0265090 A1* 10/2009 Poe et al. .......... 701/120
2010/0036793 A1* 2/2010 Willis et al. .......... 706/52
2010/0250030 A1* 9/2010 Nichols et al. .......... 701/7
2011/0191284 A1* 8/2011 Dalton .......... 706/58
2011/0196598 A1* 8/2011 Feyereisen et al. .......... 701/120

OTHER PUBLICATIONS

U.S. Appl. No. 13/236,676, filed Sep. 20, 2011, Carrico et al.

* cited by examiner

*Primary Examiner* — Khoi Tran
*Assistant Examiner* — Harry Oh
(74) *Attorney, Agent, or Firm* — Donna P. Suchy; Daniel M. Barbieri

(57) ABSTRACT

Present novel and non-trivial system, apparatus, and method for generating airport hot spot information system are disclosed. A navigation data source and an airport surface data source provide navigation data and airport surface data to a hot spot information generator ("HSIG"). The hot spot data is representative of locations of vertices corresponding to at least one airport hot spot. The HSIG determines the distance between ownship and each vertex of the vertices, and generates advisory alert data if a threshold advisory parameter has been breached; the threshold advisory parameter is a threshold advisory distance and/or a threshold advisory time, and both are configurable by a manufacturer and/or an end-user. The advisory alert data is provided to a presentation system in which a visual alert and/or an aural alert is presented to the pilot on a visual display unit and/or through an aural alert unit.

21 Claims, 8 Drawing Sheets

SYSTEM, APPARATUS, AND METHOD FOR GENERATING AIRPORT HOT SPOT INFORMATION

BACKGROUND OF THE INVENTION

1. Field of the Invention

This invention pertains generally to the field of aircraft display units that present flight information to the pilot or flight crew of an aircraft.

2. Description of the Related Art

A great deal of attention in the aviation industry has been paid to the avoidance of runway incursions. A runway incursion is an incident at an airport which adversely affects runway safety. Runway incursions are the most noticeable form of taxi navigation errors. Increased scrutiny by regulatory authorities has only heightened the awareness of the safety issues related to runway incursions. Taxi navigation errors cause many runway incursions and present potential collision hazards.

Inventors have addressed the issue of runway incursion. For example, Carrico et al addresses the issue of runway incursion in U.S. patent application Ser. No. 13/236,676 entitled "System, Apparatus, and Method for Generating Airport Surface Incursion Alert." In another example, Corcoran III addresses the issue of runway incursion in U.S. Pat. No. 6,606,563 entitled "Incursion Alerting System." In Corcoran III, a system for alerting the occupant of a vehicle that the vehicle is approaching a zone of awareness, where the zone of awareness surrounds a runway and is based upon a reference such as a line or line segment that defines a runway centerline. When the vehicle is within a predetermined value of the zone of awareness, an alert is provided to the occupant. That is, a processor calculates the difference between the zone of awareness and the aircraft and initiates the alerting device if the distance is within predetermined parameters. The processor may also take into account the direction of travel and/or velocity when initiating the alert to adjust predetermined parameters by, for instance, increasing a fixed distance at which the alert is initiated if the vehicle is approaching the zone of awareness. Alternatively, the processor may adjust values corresponding to the location of the vehicle, location of the reference upon which the zone of awareness is based, or the distance between the vehicle location and reference location, according to the velocity, direction of travel, or both.

In another example, Roe et al discusses an on-ground Runway Awareness and Advisory System ("RAAS") in U.S. Pat. No. 7,587,278 entitled "Ground Operations and Advanced Runway Awareness and Advisory System." In Roe, the RAAS enhances situational awareness during taxiing by providing advisories to the pilot. The RAAS algorithm determines whether the aircraft will cross a runway or whether the aircraft is on the runway and provides applicable advisories. For landing and on-ground aircraft, the RAAS constructs an advisory annunciation envelope or bounding box from which situational awareness annunciations are announced. An AuralNisual Advisory Processing function generates an advisory when a runway encounter is triggered when an aircraft enters the envelope surrounding the runway that could be augmented as a function of ground speed.

Airport complexity, approach patterns, airborne and surface traffic, and on-time departure/arrival pressures are some of the factors which can make flying a real challenge for today's pilots. Improvements in avionics technologies such as the incursion alerting system described in Carrico, Corcoran III, and Roe have helped to improve the aviation safety record. Despite many improvements, situational awareness of the runway environment and other potential ground hazards still remains a significant safety issue.

The International Civil Aviation Organization ("ICAO") has defined a hot spot as "a location on an aerodrome movement area with a history or potential risk of collision or runway incursion, and where heightened attention by pilots and drivers is necessary." By identifying hot spots, it is easier for users of an airport to plan the safest possible path of movement in and around that airport. Planning is a crucial safety activity for airport users—both pilots and air traffic controllers alike. By making sure that aircraft surface movements are planned and properly coordinated with air traffic control, pilots add another layer of safety to their flight preparations. Proper planning helps avoid confusion by eliminating last-minute questions and building familiarity with known problem areas of defined hot spots. Moreover, receiving real-time, hot spot information when the aircraft is located in close proximity to one or more hot spots will further enhance his or her airport surface situational awareness.

BRIEF SUMMARY OF THE INVENTION

The embodiments disclosed herein present novel and non-trivial system, apparatus, and method for generating airport hot spot information.

In one embodiment, a system for generating airport hot spot information is disclosed. The system may be comprised of a navigation data source, an airport surface data source storing hot spot data, and a hot spot information generator ("HSIG") configured to perform the method disclosed below. The system may further include a presentation system configured to receive advisory alert data generated by the HSIG and comprised of a visual display unit and/or an aural alert unit and present a hot spot advisory alert either visually, aurally, or both.

In another embodiment, an apparatus for generating airport hot spot information is disclosed. The apparatus may be the HSIG configured to perform the method disclosed in the following paragraph. The apparatus could include input and output interfaces to facilitate the receiving of the navigation data and the hot spot data and providing of advisory alert data to at least one user system such as the presentation system. The HSIG and the input and output interfaces could be part of a printed circuit board.

In another embodiment, a method for generating, airport hot spot information is disclosed, where the method may be performed by the HSIG. When configured to perform the method, the HSIG may receive navigation data representative of at least ownship position, retrieve hot spot data based upon the navigation data, determine the distance between ownship and each vertex of the vertices, and generate advisory alert data representative of an advisory alert if a threshold advisory parameter has been breached.

The hot spot data could be representative of locations of vertices corresponding to one or more airport hot spots. In one embodiment, the threshold advisory parameter may be a threshold advisory distance that is breached when the distance between ownship and at least one vertex of the vertices is less than or equal to the threshold advisory distance. In another embodiment, the threshold advisory parameter may be a threshold advisory time that is breached when the time between ownship and at least one vertex of the vertices is less than or equal to the threshold advisory time. In another embodiment, the threshold advisory parameter may be a threshold advisory distance that is breached when the distance between ownship and at least one vertex of the vertices located in front of ownship is less than or equal to the threshold advisory distance, where a vertex is considered to be located in front of ownship if the bearing to it from ownship is less than or equal to a maximum allowable bearing.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
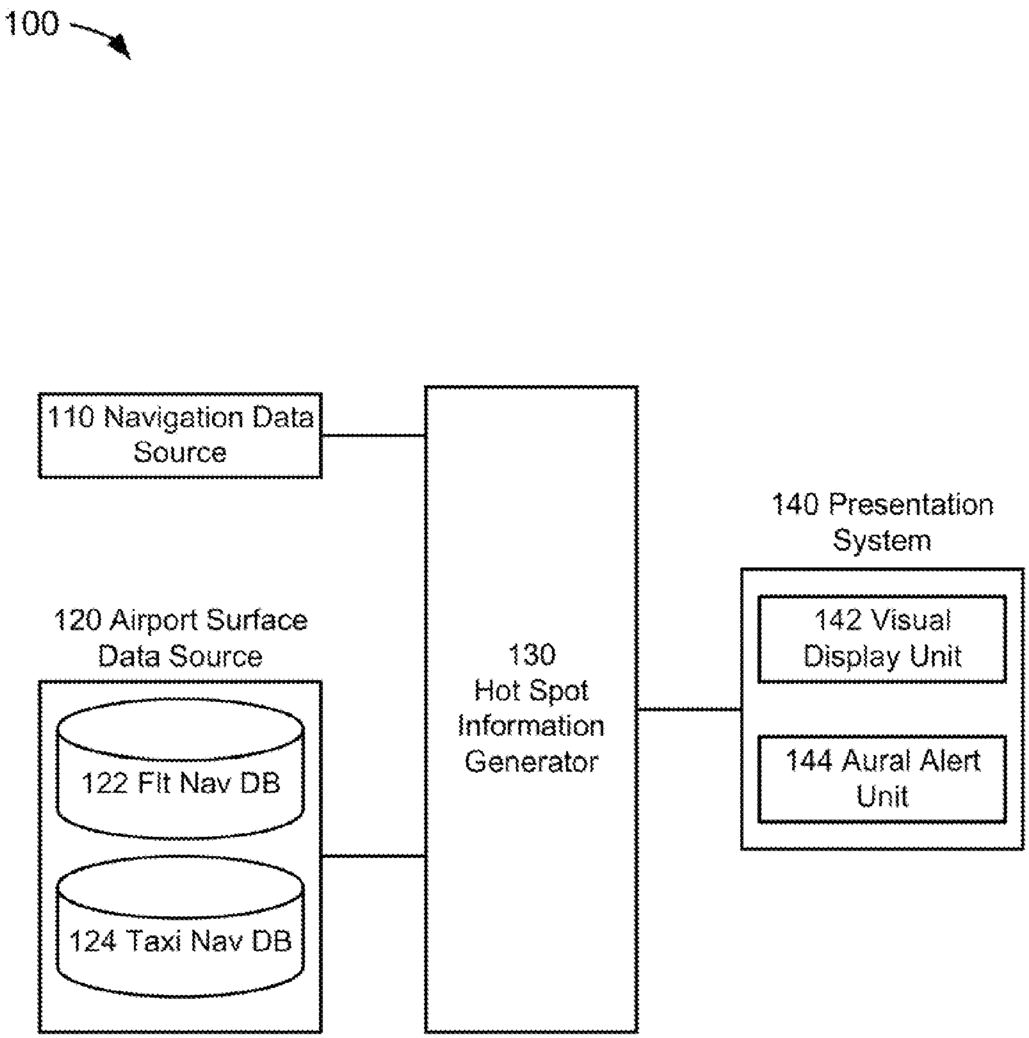
FIG. 1 depicts a block diagram of a hot spot information generating system.

FIG. 1 depicts a block diagram of a hot spot information generating system 100 suitable for implementation of the techniques described herein. The generating system 100 of an embodiment of FIG. 1 includes a navigation data source 110, an airport surface data source 120, a hot spot information generator ("HSIG") 130, and a presentation system 140.

In an embodiment of FIG. 1, the navigation data source 110 could be comprised of any source(s) which provides data representative of ownship information, where such information could be comprised of, but not limited to, horizontal position, vertical position, pressure altitude, horizontal velocity (e.g., ground speed), vertical velocity, horizontal position accuracy, vertical position accuracy, horizontal velocity accuracy, vertical velocity accuracy, ground track, and/or ownship intended flight path information. One navigation data source 110 for providing ownship information data could be a navigation system found in an aircraft. It should be noted that data, as embodied herein for any source or system in an aircraft including the navigation system, could be comprised of any analog or digital signal, either discrete or continuous, which could contain information. As embodied herein, data and signals are treated synonymously. Ownship could mean any vehicle which is able to fly through the air or atmosphere including, but not limited to, lighter than air vehicles and heavier than air vehicles, wherein the latter may include fixed-wing and rotary-wing vehicles. Aircraft may also include any surface vehicles which operate on airport surfaces and could be equipped with the generating system 100 disclosed herein.

The navigation system may include, but is not limited to, an air/data system, an attitude heading reference system, an inertial guidance system (or inertial reference system), a global navigation satellite system (or satellite navigation system), and/or a flight management system ("FMS") (which is comprised of, in part, a database), all of which are known to those skilled in the art. As embodied herein, the navigation data source 110 may provide ownship information data to the HSIG 130 for subsequent processing as discussed herein.

In an embodiment of FIG. 1, the airport surface data source 120 could be comprised of any source(s) of airport surface reference data. The airport surface data source 120 may include, but is not limited to, a flight navigation database 122 that may be part of an FMS and/or a taxi navigation database 124. It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

The flight navigation database 122 may contain records which provide surface reference data such as, but not limited to, runway surface data such as at least one landing threshold point ("LTP"), runway direction and elevation data, airport data, and/or approach data. The flight navigation database 122 could be a database described in the following documents published by Aeronautical Radio, Incorporated ("ARINC"): ARINC Specification 424-18 entitled "Navigations Systems Data Base" ("ARINC 424"), an aviation industry standard known to those skilled in the art.

The taxi navigation database 124 may be used to store airport data that may be representative of, in part, airport surfaces. Airport surfaces include, but are not limited to, locations and information delineating or defining locations of hot spots, runways, taxiways, apron areas, fixed based operators, terminals, and other airport facilities. The taxi navigation database 124 could comprise an aerodrome mapping database ("AMDB") as described in the following aviation industry standards published by both RICA, Incorporated and ARINC: RTCA DO-272A entitled "User Requirements for Aerodrome Mapping Information" and ARINC Specification 816-1 entitled "Embedded Interchange Format for Airport Mapping Database" ("ARINC 816"). DO-272A provides for aerodrome surface mapping requirements for aeronautical uses on-board aircraft, and ARINC 816 defines an open encoding format for airport databases that may be loaded in aircraft systems. Those skilled in the art appreciate that aviation standards may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB and/or the encoding format. As embodied herein, the airport surface data source 120 may provide airport surface data representative of, in part, hot spots to the HSIG 130 for subsequent processing as discussed herein.

In an embodiment of FIG. 1, the HSIG 130 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The HSIG 130 may be driven by the execution of software or computer instruction code containing algorithms developed for the specific functions embodied herein. The HSIG 130 may be an application-specific integrated circuit (ASIC) customized for the embodiments disclosed herein. Common examples of electronic data processing units are microprocessors, Digital Signal Processors (DSPs), Programmable Logic Devices (PLDs); Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. The HSIG 130 could be a processor(s) used by or in conjunction with any other system of the aircraft including, but not limited to, the navigation data source 110, the airport surface data source 120, and the presentation system 140, or any combination thereof.

The HSIG 130 may be programmed or configured to receive as input data representative of information obtained from various systems and/or sources including, but not limited to, the navigation data source 110 and the airport surface data source 120. As embodied herein, the terms "programmed" and "configured" are synonymous. The HSIG 130 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The HSIG 130 may be programmed or configured to execute one or both of the methods discussed in detail below. The HSIG 130 may be programmed or configured to provide a traffic symbology data set to various systems and/or units including, but not limited to, the presentation system 140.

The presentation system 140 could be comprised of a visual display unit 142 and/or an aural alerting unit 144 for presenting the pilot with surface situational awareness information. The visual display unit 142 could be, but is not limited to, a head-up display unit ("HUD"), a head-down display unit ("HDD"), a primary flight director, a navigation display, a tactical display unit, a strategic display unit, a multi-purpose control display unit, a multi-function display unit, a side display unit, an electronic flight bag (e.g., a handheld device with a display area), and/or a data link control display unit. The HDD unit is typically a unit for providing flight information to the pilot that is mounted to an aircraft's flight instrument panel located to the front of a pilot and below the windshield and the pilot's external field of vision. The HUD unit is mounted to the front of the pilot at windshield level and is directly in the pilot's external field of vision. The HUD system is advantageous because the display is transparent allowing the pilot to keep his or her eyes "outside the cockpit" while the display unit provides flight information to the pilot.

The visual display unit 142 may include a vision system (not shown) which generates an image data set which represents the image displayed on the visual display unit 142. Vision systems could include, but are not limited to, a synthetic vision system ("SVS"), an enhanced vision system ("EVS"), and/or a combined SVS-EVS. The visual display unit 142 could be capable of presenting surface alert information including advisories related to hot spots. Alerts may be based on level of threat or conditions requiring immediate crew awareness. Caution alerts may be alerts requiring immediate crew awareness and subsequent flight crew response. Warning alerts may be alerts requiring immediate flight crew action. Advisory alerts may be alerts that are advisory (i.e., informational) in nature that do not have the immediacy requirements of caution alerts and/or warning alerts. As embodied herein, any alert may be presented in combination with or simultaneous to aural alerts. Alerts may be presented visually by depicting one or more colors that may be presented on the visual display unit 142 indicating one or more levels of threat. For the purpose of illustration and not limitation, green may indicate an advisory alert, amber or yellow may indicate a caution alert, and red may indicate a warning alert.

In one embodiment, visual advisory alerts could be presented in a textual form including text messages such as a green "APPROACHING HOT SPOT NO. 1" when an advisory threshold time and/or distance has been crossed. It should be noted that the preceding text message should be considered as a generic message, knowing that a manufacturer and/or end-user have the ability to configure any message that they may determine is appropriate to convey the caution and/or warning messages. In another embodiment, visual advisory alerts could be presented in a non-textual form such as a symbol. In another embodiment, textual and non-textual forms could remain steady or flash intermittently, where the speed of such flashing could depend on the time and/or distance to an advisory point(s) as discussed in detail below.

The aural alerting unit 144 may be any unit capable of producing aural alerts. Aural alerts may be discrete sounds, tones, and/or verbal statements used to annunciate a condition, situation, or event. In one embodiment, an aural alert could call out "APPROACHING HOT SPOT NO. 1" when an advisory threshold time and/or distance has been crossed. As embodied herein, advisory aural alerts could be presented in combination with or simultaneous to visual advisory alerts.

Figure 2A:
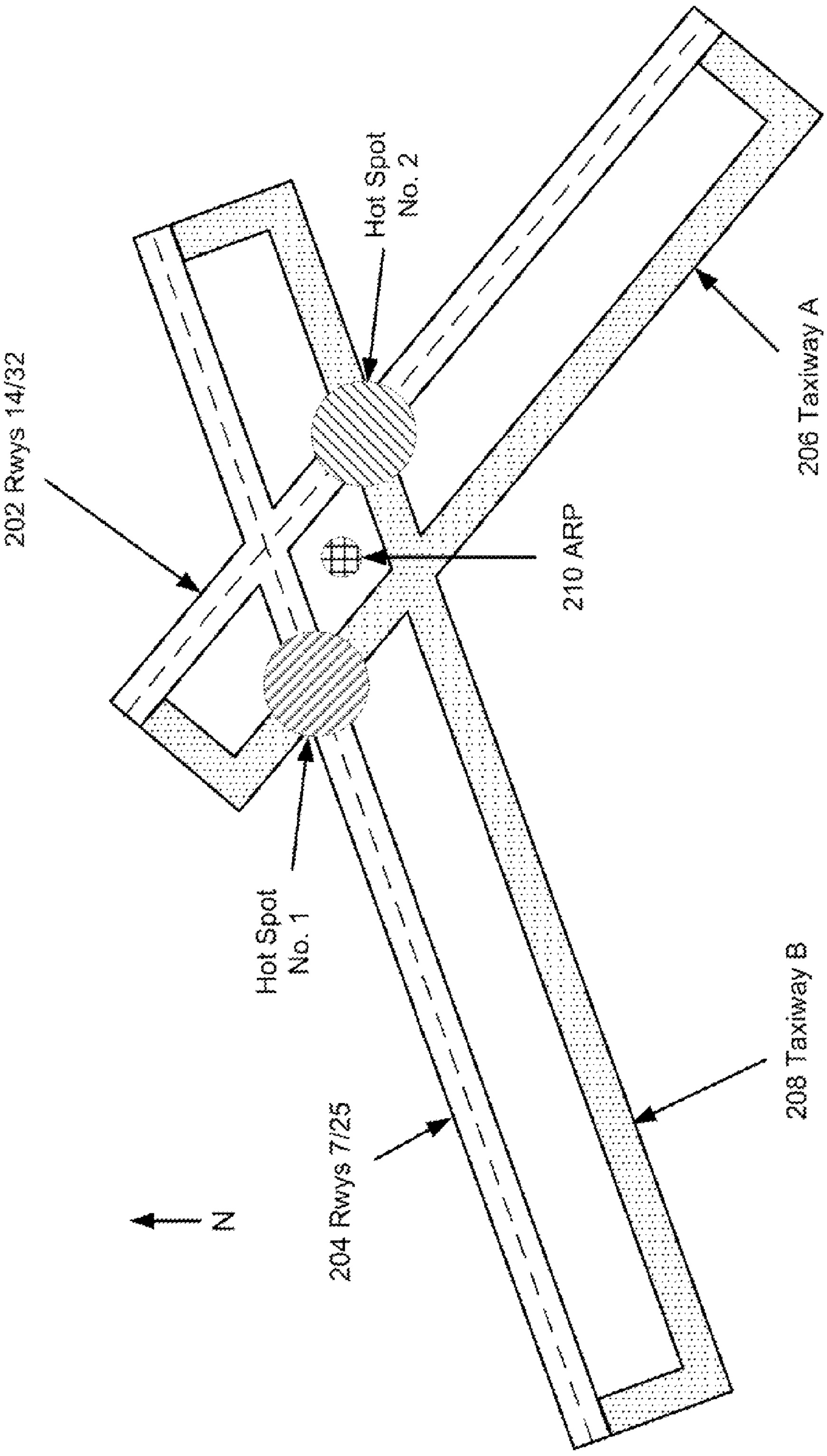
FIG. 2A provides an illustration of two airport hot spots intersecting with runways and taxiways.

The advantages and benefits of the embodiments discussed herein may be illustrated by showing how data representative of the reference points of an airport surface or feature such as a hot spot may be retrieved and used to generate pilot advisories to improve a pilot's situational awareness of the surface environment of an airport. The drawings of FIG. 2 illustrate an airport comprised of two runway surfaces (i.e., four runways) and two taxiway surfaces. Although the illustrations herein will be drawn to two runway surfaces and two taxiway surfaces and intersections formed by runways and taxiways, the disclosures presented herein may be applied to any hot spot. As shown in FIG. 2A, the surface of an airport are shown. There are two runway surfaces indicated as Runways 14/32 (item 202) and Runways 7/25 (item 204), and the two taxiway surfaces indicated as Taxiway A 206 and Taxiway B 208. In addition, there are two hot spots identified as Hot Spot No. 1 and Hot Spot No. 2, respectively. Hot Spot No. 1 coincides with the intersection of Runways 7/25 and Taxiway A, and Hot Spot No. 2 coincides with the intersection of Runways 14-32 and Taxiway B. Also, there is an aerodrome reference point ("ARP") 210 of the airport.

The International Civil Aviation Organization ("ICAO") has defined a hot spot as "a location on an aerodrome movement area with a history or potential risk of collision or runway incursion, and where heightened attention by pilots and drivers is necessary." The shape of hot spots may vary, but they may be defined as polygons. If so, then the hot spot could be defined as a series of polygonal vertices, and the data representative of each hot spot could be comprised of a plurality of vertices stored in the airport surface data source 120. The retrieval of hot spot data may be based upon the ownship position data received from the navigation data source 110.

Figure 2B:
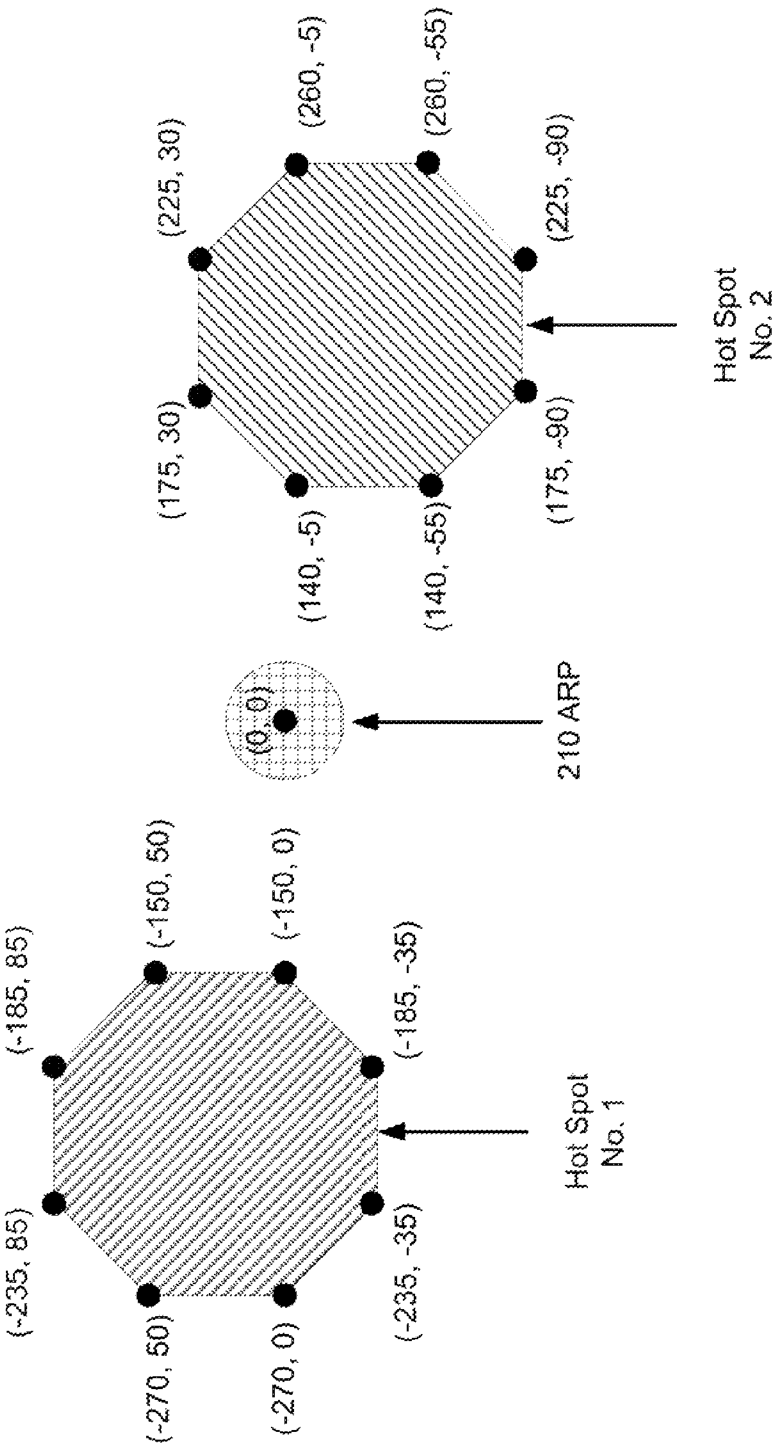
FIG. 2B illustrates the vertices of two airport hot spots and an aerodrome reference point.

Referring to FIG. 2B, Hot Spot No. 1, Hot Spot No. 2, and the ARP 210 that were introduced in FIG. 2A are presented in an exploded view but without the airport surfaces. To demonstrate how hot spots may be defined by data representative of polygonal vertices, the shapes of Hot Spot Nos. 1 and. 2 will be presented as octagons for the sole purpose of illustration and not of limitation. The ARP 210 may serve as a origin of a local reference system from which the vertices are referenced; it should be noted that the world coordinates (e.g., latitude/longitude coordinates) of the ARP 210 may be retrieved for the purpose of converting the hot spot vertices into world coordinates. In the illustration provided in FIG. 2B, the vertices for Hot Spot Nos. 1 and 2 are local coordinates that have been retrieved from the airport surface data source 120 based upon ownship being located at the aircraft as determined from ownship position information received from the navigation data source 110. It should be noted that, although the illustration is drawn to the ARP 210 and a local reference system, a conversion may not be necessary if the vertices that are stored in the airport surface data source 120 correspond to world coordinates.

Figure 2C:
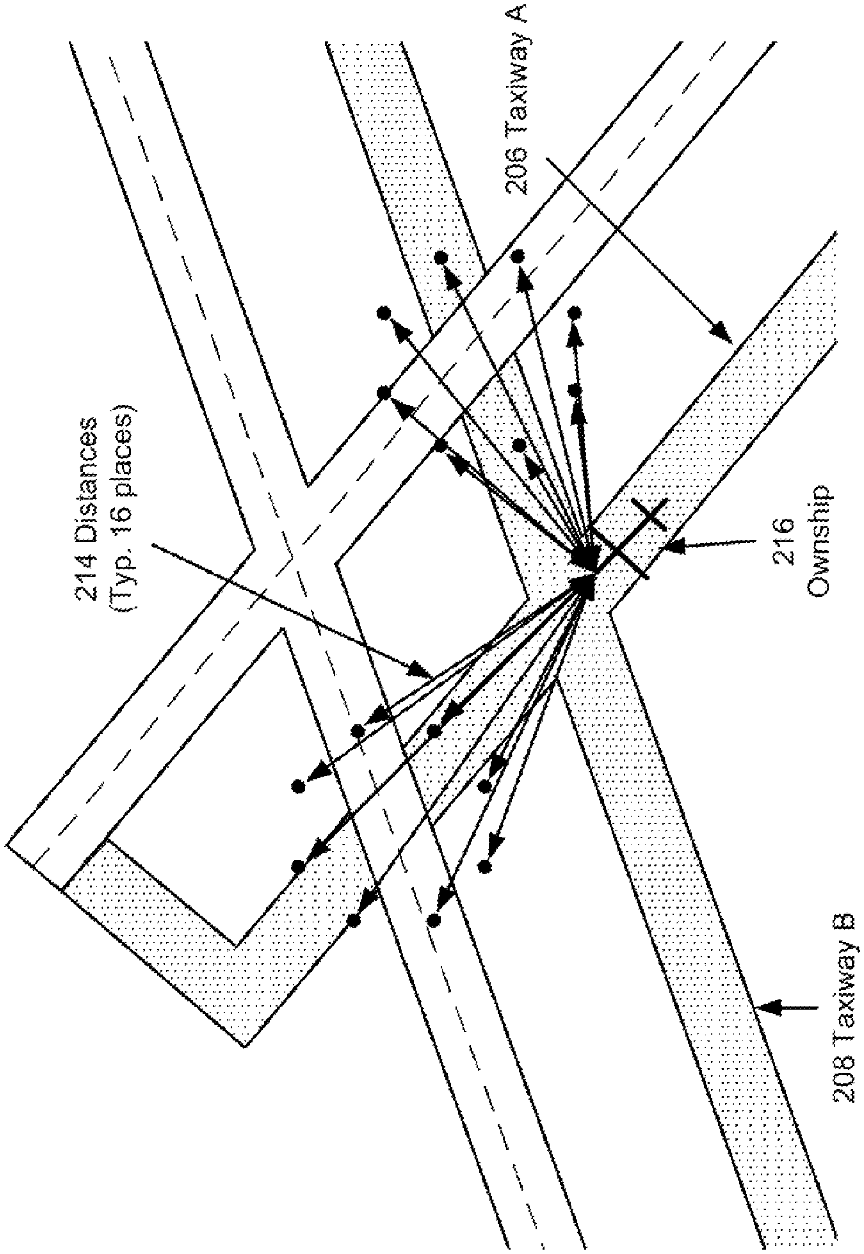
FIG. 2C provides an illustration depicting the distances between ownship and each vertex of the vertices of hot spots.

Referring to FIG. 2C, ownship 212 is located on Taxiway A 206 and near the intersection of Taxiway A 206 and Taxiway B 208. Once a coordinate conversion has been performed on the vertices, distances 214 between ownship and each vertex may be determined using the aircraft position information received from the navigation data source 110. If one or more of the plurality of distances 214 is equal to or less than a threshold advisory parameter of a threshold advisory distance, then such distance has been breached and a visual advisory alert and/or an aural advisory alert may be generated and provided to the presentation system 140. Alternatively, the time to each vertex may be determined when data representative of speed information, where the navigation data source 110 could provide the ground speed information or ownship position information from which the ground speed could be determined. If one or more of the plurality of times is equal to or less than a threshold advisory parameter of a threshold advisory time, then such time has been breached and a visual advisory alert and/or an aural advisory alert may be generated and provided to the presentation system 140. For an example of FIG. 2C, it will be assumed that one or more vertices of both hot spots have been breached by being less than or equal to a threshold advisory parameter. As embodied herein, the threshold advisory distance and/or threshold advisory time may be configurable by a manufacturer and/or end-user.

Figure 2D:
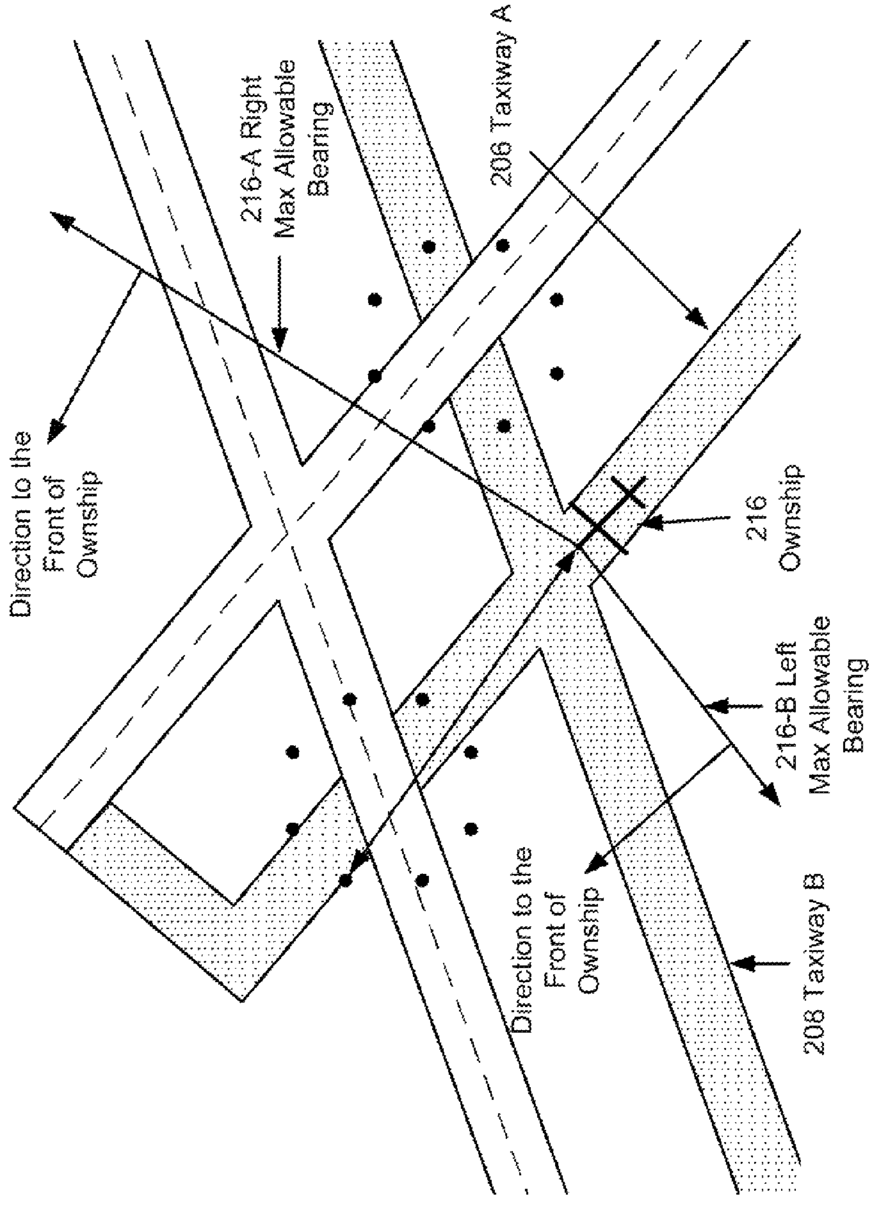
FIG. 2D provides an illustration depicting two maximum allowable bearings to determine the direction to the front of ownship.

When the threshold alert parameter is a threshold alert distance, the threshold advisory parameter may be breached when the distance between ownship and at least one vertex of the vertices located in front of ownship is less than or equal to the threshold advisory distance. By checking on whether a vertex is located in front of ownship, the threshold advisory parameter may not be breached even though the distance to it is less than or equal to the threshold advisory distance. To determine whether the vertex is located in front of ownship and referring to FIG. 2D, a maximum allowable bearing(s) 216 could be configured by a manufacturer and/or end-user (e.g., plus or minus 80 degrees measured from the heading of ownship), and if the bearing to the vertex is greater than the maximum allowable bearing to the vertex, there is may be no breach even though the distance between ownship and the vertex is less than or equal to the threshold advisory distance. As shown in FIG. 2D, the threshold advisory parameter is not breached even though one or more of the distances to the vertices of Hot Spot No. 2 are less than or equal to the threshold advisory distance as in FIG. 2C.

Figure 3A:
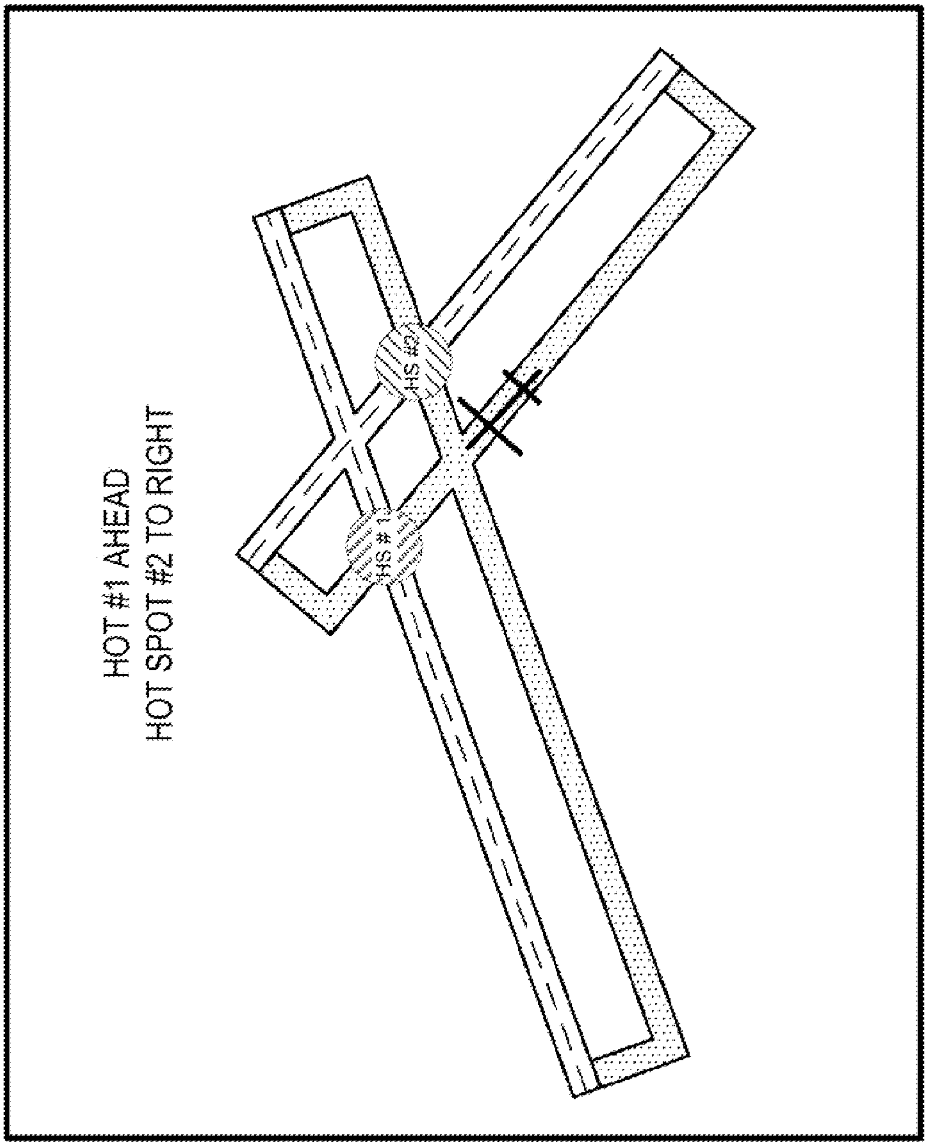
FIG. 3 provides a depiction of hot spot information appearing on an airport surface moving map that is presented on a visual display unit.
Figure 3B:
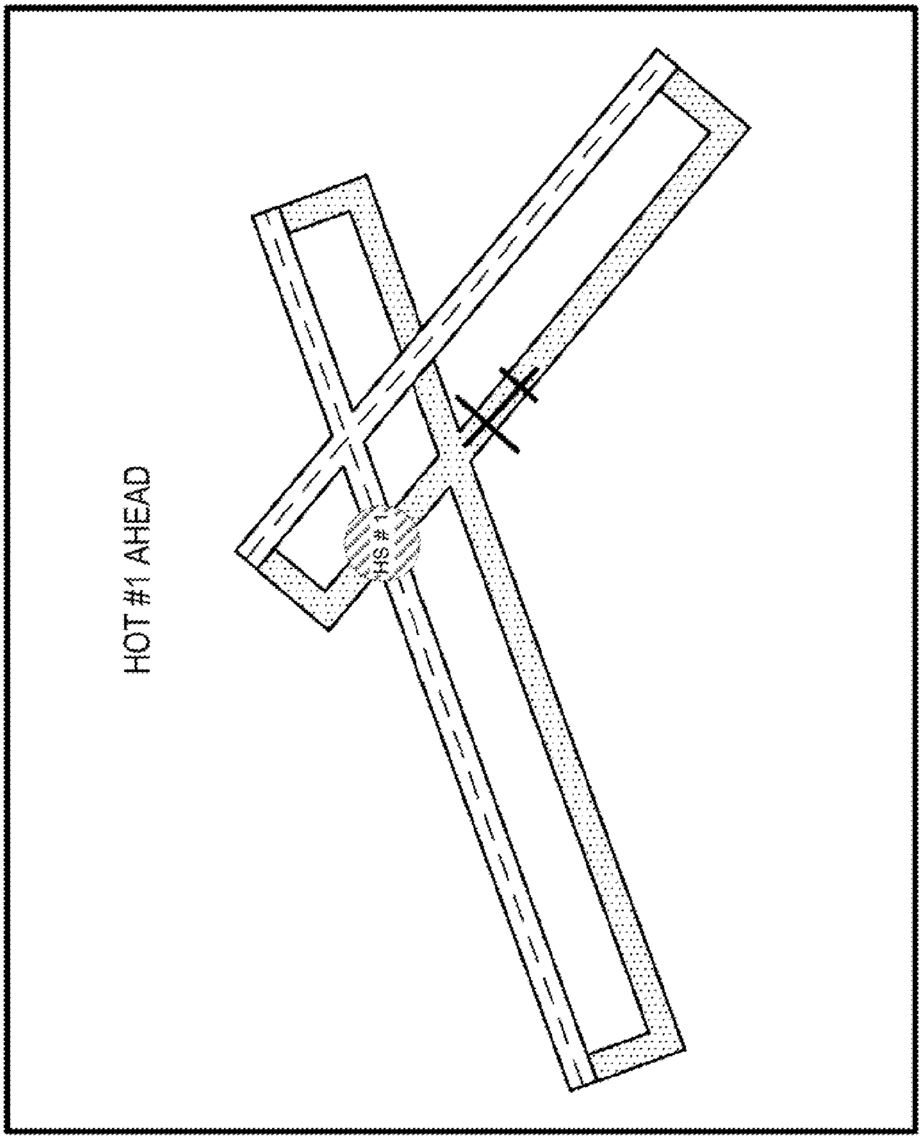

In an embodiment of the drawings of FIG. 3, the visual display unit 142 of the presentation system 140 is shown with an airport surface moving map ("ASMM") of the airport and corresponding surfaces. If one or more threshold advisory parameters have been breached for both Hot Spot Nos. 1 and 2 (as shown in FIG. 2C), the visual textual alerts "HOT SPOT #1 AHEAD" and "HOT SPOT #2 TO RIGHT" and the locations of both hot spots have been displayed on the ASMM as shown in FIG. 3A; if one or more threshold advisory parameters have been breached for Hot Spot Nos. 1 but not for Hot Spot No. 2 (as shown in FIG. 2D), the visual textual alerts "HOT SPOT #1 AHEAD" and/or the location of the hot spot has been displayed on the ASMM as shown in FIG. 3A. Also, the locations of the hot spots have been annunciated with non-textual, graphical symbols comprised of circles with "HS #1" and "HS #2" identifiers (the circles may be yellow). Annunciating effects known to those skilled in the art such as flashing or glowing may be added to the presentation of the hot spot symbols.

Figure 4:
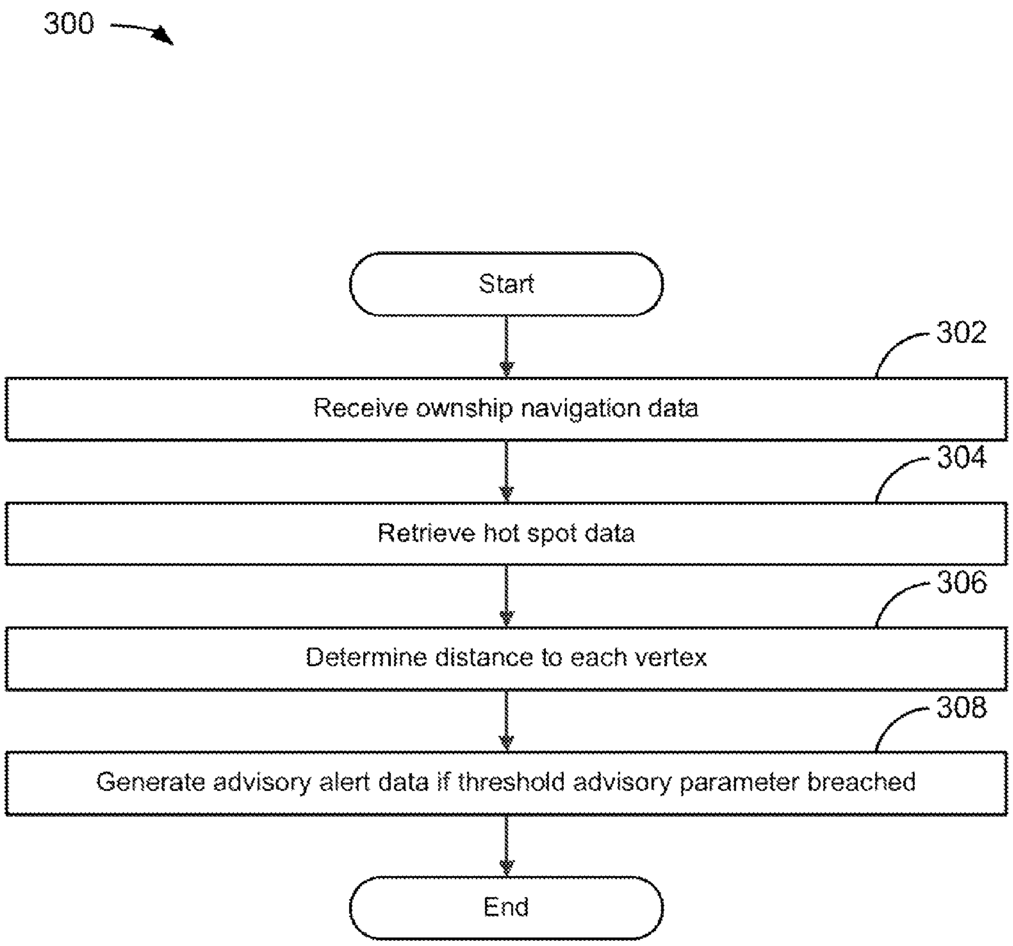
FIG. 4 depicts a flowchart of a method for generating airport hot spot information.

FIG. 4 depicts flowchart 300 that provides an example of how advisory alert data is generated, where the HSIG 130 may be programmed or configured with instructions corresponding to the following modules. As embodied herein, the HSIG 130 may be a processor of a module such as, but not limited to, a printed circuit card having one or more input interfaces to facilitate data communications with the HSIG 130, i.e., the receiving and providing of data. As necessary for the accomplishment of the following modules embodied in FIG. 4, the receiving of data is synonymous and/or interchangeable with the retrieval of data, and the providing of data is synonymous and/or interchangeable with the making available or supplying of data.

The flowchart begins with module 302 with the receiving of navigation data from the navigation data source 110. This data may be representative of the position of ownship from which ground speed information and/or heading information may be determined by using changes of position when ownship moves. Alternatively, the navigation data could include data representative of ground speed information and/or ground track information.

The flowchart continues with module 304 with the retrieving of hot spot data from the airport surface data source 120 based upon ownship position. This hot spot data may be representative of locations of vertices corresponding to one or more airport hot spots. As stated above, data representative of the locations of hot spot vertices may be retrieved from one or more airport surface data sources 120 such as an ARINC 816 database. If the locations are stated with reference to a reference system (e.g., a local reference system), then the hot spot data could include data representative of a reference point (e.g., an ARP). If so, then a conversion to a global reference system may be included. If the locations of the vertices are stated with reference to a global reference system (i.e., in global coordinates), then a conversion may not be necessary.

The flowchart continues with module 306 with the determining of the distance between ownship and each vertex of the vertices. The flowchart continues with module 308 with the generation of advisory alert data if a threshold advisory parameter has been breached, where the advisory alert data may be representative of an advisory alert comprised of a visual advisory alert and/or an aural advisory alert.

As discussed above, the threshold advisory parameter may be comprised of a threshold advisory distance and/or a threshold advisory time, where each may be configurable by a manufacturer and/or an end-user. If the threshold advisory parameter is a threshold advisory distance, then the threshold advisory parameter may be breached when the distance between ownship and at least one vertex of the vertices is less than or equal to the threshold advisory distance; likewise, if the threshold advisory parameter is a threshold advisory time, then the threshold advisory parameter may be breached when the time between ownship and at least one vertex of the vertices is less than or equal to the threshold advisory time. In an additional embodiment in which the threshold alert parameter is a threshold alert distance, the threshold advisory parameter may be breached when the distance between ownship and at least one vertex of the vertices located in front of ownship is less than or equal to the threshold advisory distance.

In an additional embodiment, the advisory alert data could be provided to the presentation system 140. If the advisory alert is comprised of a visual advisory alert, then the advisory alert represented in the advisory alert data (i.e., the visual advisory alert) may be presented to a pilot on the screen of the visual display unit 142. If the advisory alert is comprised of an aural advisory alert, then the advisory alert represented in the advisory alert data (i.e., the aural advisory alert) may be presented aurally to a pilot through the aural alert unit 144. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating airport hot spot information, such system comprising:
a navigation data source;
an airport surface data source; and
a hot spot information generator configured to
receive navigation data representative of at least ownship position from the navigation data source,
retrieve hot spot data from the airport surface data source based upon the navigation data, where
the hot spot data is representative of at least one hot spot, where
each hot spot is comprised of a plurality of vertices, where
each vertex of the plurality of vertices is defined by one location,
determine a plurality of vertex distances, where
each vertex distance is a distance between ownship position and the location of one vertex of the plurality of vertices, and
generate advisory alert data representative of an advisory alert if a threshold advisory parameter has been breached based upon the determination of the plurality of vertex distances.

2. The system of claim 1, wherein
the hot spot information generator is further configured to
convert the location of each vertex of the plurality of vertices into global coordinates based upon a location of a reference point, where
the hot spot data is further representative of the location of a reference point.

3. The system of claim 1, wherein
the threshold advisory parameter is a threshold advisory distance, and
the threshold advisory parameter has been breached when at least one vertex distance is less than or equal to the threshold advisory distance.

4. The system of claim 1, wherein
the threshold advisory parameter is a threshold advisory distance, and
the threshold advisory parameter has been breached when the vertex distance of at least one vertex located in front of ownship is less than or equal to the threshold advisory distance, where
a vertex is located in front of ownship if the bearing between it and ownship is determined to be less than or equal to a maximum allowable bearing.

5. The system of claim 1, wherein
the threshold advisory parameter is a threshold advisory time, and
the threshold advisory parameter has been breached when the time from ownship position to the location of at least one vertex of the plurality of vertices is less than or equal to the threshold advisory time.

6. The system of claim 1, further comprising:
a presentation system configured to
receive the advisory alert data, where
hot spot information generator has been further configured to provide the advisory alert data to the presentation system, and
the advisory alert is comprised of a visual advisory alert, and present the advisory alert represented in the advisory alert data to a pilot, whereby
the visual advisory alert is presented on the screen of at least one visual display unit.

7. The system of claim 1, further comprising:
a presentation system configured to
receive the advisory alert data, where
hot spot information generator has been further configured to provide the advisory alert data to the presentation system, and
the advisory alert is comprised of an aural advisory alert, and present the advisory alert represented in the advisory alert data to a pilot, whereby
the aural advisory alert is presented aurally through an aural alert unit.

8. An apparatus for generating airport hot spot information, such apparatus comprising:
a hot spot information generator configured to
receive navigation data representative of at least ownship position from the navigation data source;
retrieve hot spot data from the airport surface data source based upon the navigation data, where
the hot spot data is representative of at least one hot spot, where
each hot spot is comprised of a plurality of vertices, where
each vertex of the plurality of vertices is defined by one location;
determine a plurality of vertex distances, where
each vertex distance is a distance between ownship position and the location of one vertex of the plurality of vertices; and generate advisory alert data representative of an advisory alert if a threshold advisory parameter has been breached based upon the determination of the plurality of vertex distances.

9. The apparatus of claim 8, wherein the hot spot information generator is further configured to convert the location of each vertex of the plurality of vertices into global coordinates based upon a location of a reference point, where the hot spot data is further representative of the location of a reference point.

10. The apparatus of claim 8, wherein the threshold advisory parameter is a threshold advisory distance, and the threshold advisory parameter has been breached when at least one vertex distance is less than or equal to the threshold advisory distance.

11. The apparatus of claim 8, wherein the threshold advisory parameter is a threshold advisory distance, and the threshold advisory parameter has been breached when the vertex distance of at least one vertex located in front of ownship is less than or equal to the threshold advisory distance, where a vertex is located in front of ownship if the bearing between it and ownship is determined to be less than or equal to a maximum allowable bearing.

12. The apparatus of claim 8, wherein the threshold advisory parameter is a threshold advisory time, and the threshold advisory parameter has been breached when the time from ownship position to the location of at least one vertex of the plurality of vertices is less than or equal to the threshold advisory time.

13. The apparatus of claim 8, wherein the hot spot information generator is further configured to provide the advisory alert data to a presentation system, where the advisory alert represented in the advisory alert data is comprised of a visual advisory alert.

14. The apparatus of claim 8, wherein the hot spot information generator is further configured to provide the advisory alert data to a presentation system, where the advisory alert represented in the advisory alert data is comprised of an aural advisory alert.

15. A method for generating airport hot spot information, such method comprising:

receiving navigation data representative of at least ownship position from the navigation data source;

retrieving hot spot data from the airport surface data source based upon the navigation data, where the hot spot data is representative of at least one hot spot, where each hot spot is comprised of a plurality of vertices, where each vertex of the plurality of vertices is defined by one location;

determining a plurality of vertex distances, where each vertex distance is a distance between ownship position and the location of one vertex of the plurality of vertices; and generating advisory alert data representative of an advisory alert if a threshold advisory parameter has been breached based upon the determination of the plurality of vertex distances.

16. The method of claim 15, further comprising:

converting the location of each vertex of the plurality of vertices into global coordinates based upon a location of a reference point, where the hot spot data is further representative of the location of a reference point.

17. The method of claim 15, wherein the threshold advisory parameter is a threshold advisory distance, and the threshold advisory parameter has been breached when at least one vertex distance is less than or equal to the threshold advisory distance.

18. The method of claim 15, wherein the threshold advisory parameter is a threshold advisory distance, and the threshold advisory parameter has been breached when the vertex distance of at least one vertex located in front of ownship is less than or equal to the threshold advisory distance, where a vertex is located in front of ownship if the bearing between it and ownship is determined to be less than or equal to a maximum allowable bearing.

19. The method of claim 15, wherein the threshold advisory parameter is a threshold advisory time, and the threshold advisory parameter has been breached when the time from ownship position to the location of at least one vertex of the plurality of vertices is less than or equal to the threshold advisory time.

20. The method of claim 15, further comprising:

providing the advisory alert data to a presentation system, where the advisory alert represented in the advisory alert data is comprised of a visual advisory alert.

21. The method of claim 15, further comprising:

providing the advisory alert data to a presentation system, where the advisory alert represented in the advisory alert data is comprised of an aural advisory alert.

* * * * *